O. W. SAMMT.
SIGNAL.
APPLICATION FILED JAN. 10, 1913.

1,108,398.

Patented Aug. 25, 1914.

2 SHEETS—SHEET 1.

Witnesses

Inventor
O. W. Sammt
By
Attorneys.

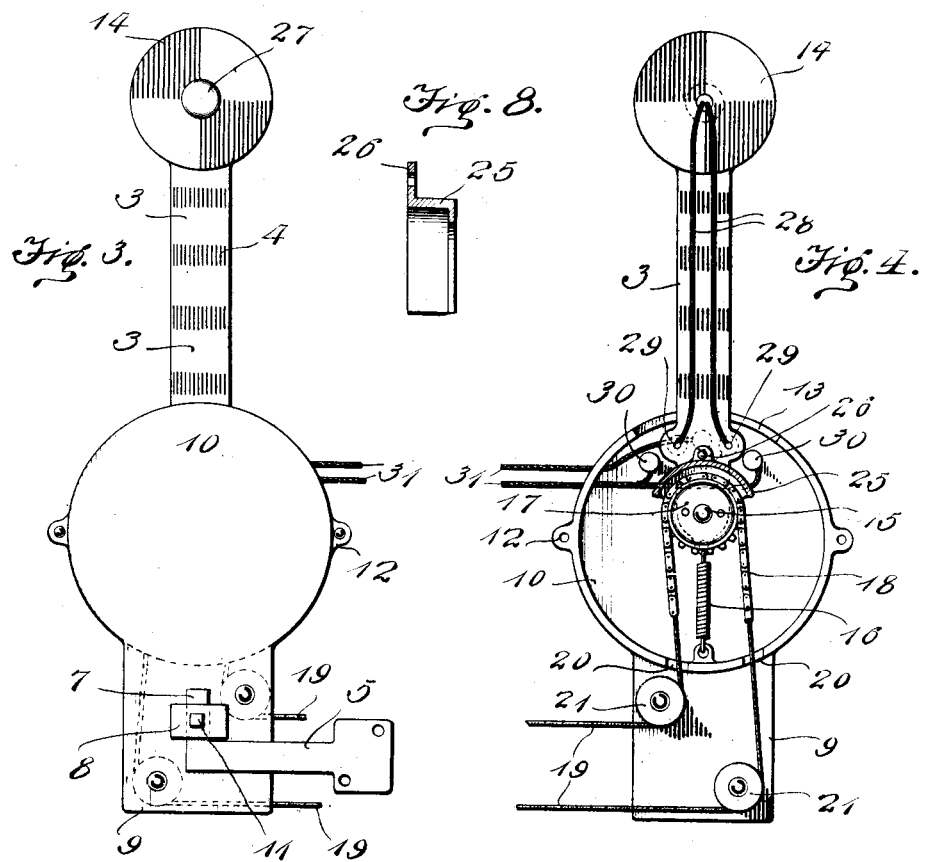
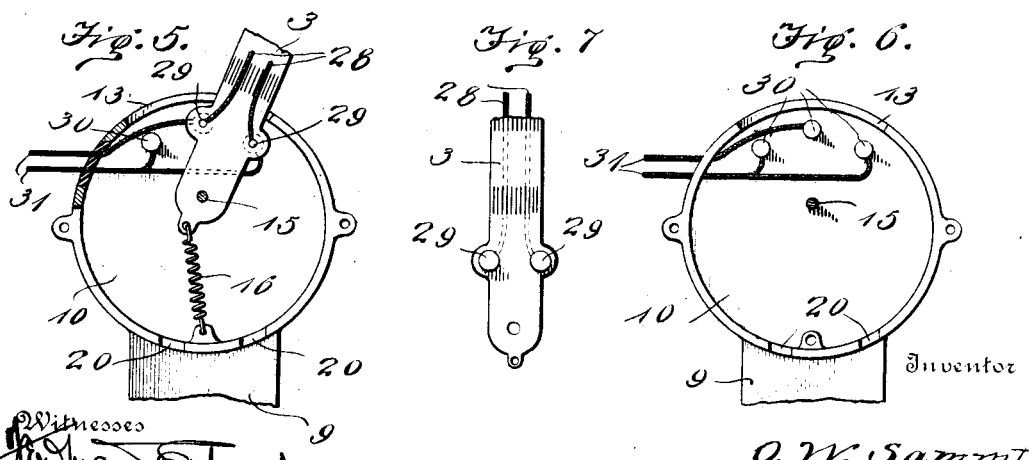

UNITED STATES PATENT OFFICE.

OTTO W. SAMMT, OF LAKE PARK, IOWA.

SIGNAL.

1,108,398.  Specification of Letters Patent.  Patented Aug. 25, 1914.

Application filed January 10, 1913. Serial No. 741,300.

*To all whom it may concern:*

Be it known that I, OTTO W. SAMMT, citizen of the United States, residing at Lake Park, in the county of Dickinson and State of Iowa, have invented certain new and useful Improvements in Signals, of which the following is a specification.

The object of this invention is to provide a simple and easily operated signal whereby the direction in which an automobile or other moving vehicle is to travel may be indicated, so that collision with other vehicles or pedestrians may be avoided.

A further object of the invention is to provide a visual signal which may be readily mounted upon any portion of the vehicle so as to be conspicuous and so arranged as to be under the control of the operator.

A further object of the invention is to provide a signal for moving vehicles, which will be composed of few parts and may, therefore, be easily cleaned or repaired when necessary and which will respond instantly to a moving impulse from the operator and will automatically return to a normal position when it is desired to indicate that the vehicle will move straight ahead.

Other incidental objects of the invention will appear as the description of the same proceeds.

The invention is illustrated in the accompanying drawings and will be hereinafter first fully described, the novel features being subsequently particularly pointed out in the appended claims.

Figure 1:
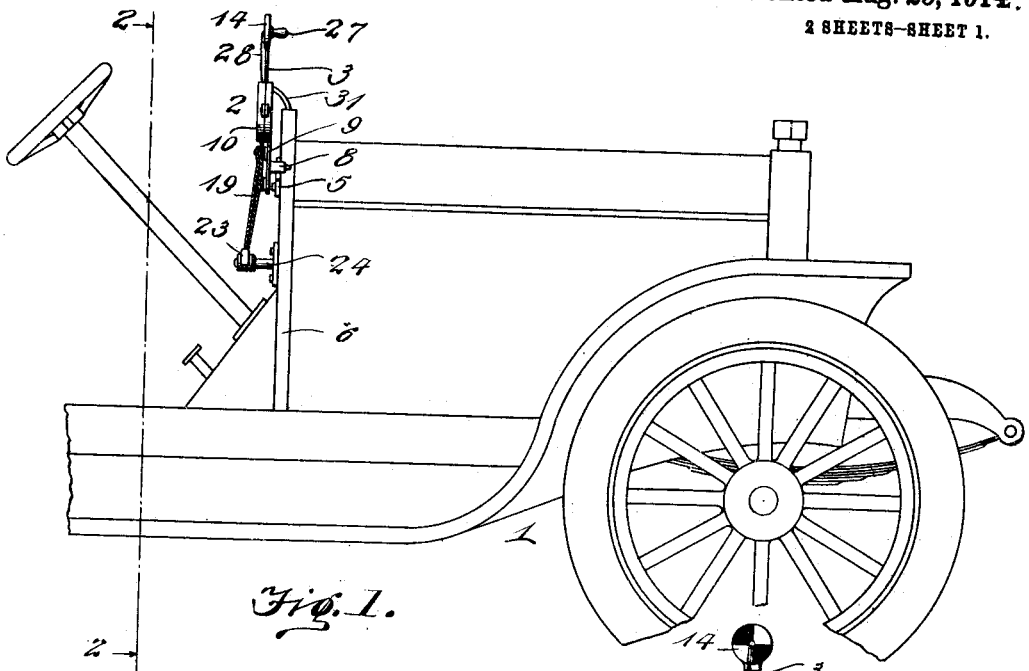
Figure 2:
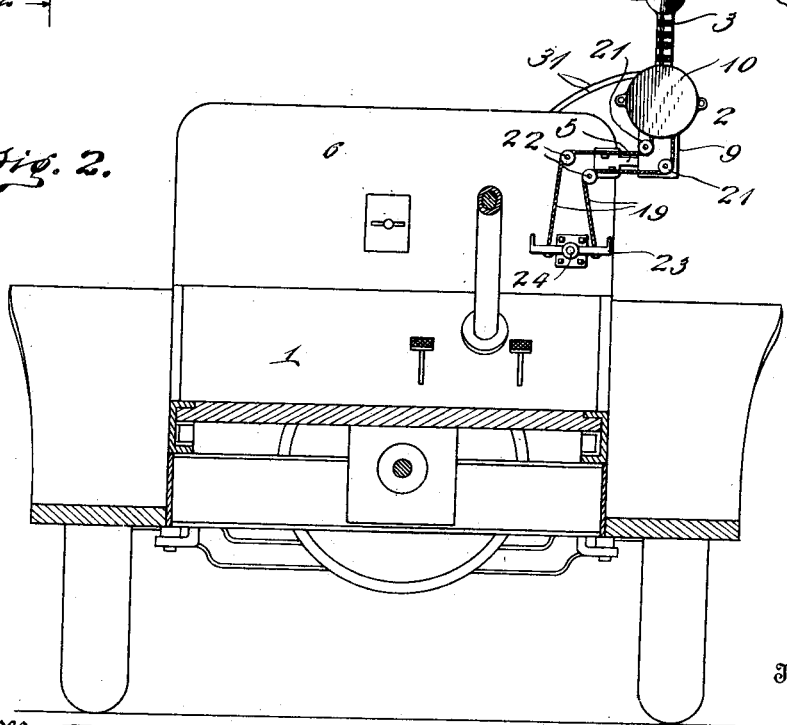

In the drawings: Figure 1 is a side elevation of a portion of an automobile showing my signal in position thereon; Fig. 2 is a transverse section of the same; Fig. 3 is an enlarged detail elevation of the signal; Fig. 4 is a vertical section through the signal casing, showing the operating mechanism; Fig. 5 is a detail view of a portion of the target, showing the same adjusted to one side, and indicating means whereby a lamp will be automatically energized so that the signal will prove effective at night; Fig. 6 is a detail view of the casing, showing the contact points therein and the wires or conductors leading from said contact points; Fig. 7 is a similar view of the lower end of the target; Fig. 8 is a detail section of a chain guard, The automobile indicated at 1 may be of any preferred type and the signal indicated, generally, at 2 may be mounted thereon in any convenient position. The signal is illustrated in the accompanying drawings as applied to the dash-board of the vehicle and will preferably be mounted thereon, as it will then be within convenient reach of the chauffeur and will also be in a conspicuous position, so that pedestrians and occupants of other vehicles may easily notice it. The signal comprises a vibratory target 3, and the several parts of the signal will be so disposed that the target will be offset somewhat laterally from the dash-board, so that it may be viewed by persons in rear of the vehicle as well as by persons at the side or in front thereof. The target and the casing in which it is mounted will also be preferably painted in stripes of contrasting colors, as indicated at 4, so that it will be very conspicuous in appearance and attract the attention of persons who are close to the vehicle and will indicate to them by the position in which it is set the direction in which it is intended to steer the vehicle, so that pedestrians and occupants of other vehicles may aid in avoiding collision.

In the particular embodiment of the invention illustrated in the accompanying drawings, a bracket 5 is secured by screws or equivalent devices to the dash-board 6, and the said bracket has an upturned arm 7 which is adapted to be engaged by an eye or loop 8 on the back of an arm 9 depending from a casing 10. This arrangement is clearly shown in Fig. 3, and it will also be noted that in said figure a set-screw 11 is mounted in the eye or loop 8 to bear upon the upturned portion 7 of the bracket and thereby secure the casing firmly upon the bracket. This set-screw imparts greater security to the device, but is not essential. The casing 10 is preferably formed of two circular members, as shown most clearly in Fig. 1, connected by bolts or screws inserted through registering lugs 12 upon the edges of the sections, and the sections are provided with notches 13 which will register when the sections are placed together, so that an opening will be provided at the top of the casing through which the target 3 may project. The target consists of an arm of suitable  an enlarged, preferably circular, head 14 at its upper end and pivoted at its lower end within the casing, as indicated at 15. To the lower extremity of the target and on the central longitudinal line thereof is secured the upper end of a spring 16, the lower end of which is secured to the bottom of the casing so as to hold the target normally in a central vertical position. Should the target be moved to either side, it will be seen at once, the spring will be distended and will then, of course, return the target to its normal vertical position immediately after the removal of the force by which it was shifted to one side.

Mounted upon the pivot pin or shaft 15 and secured rigidly to the target is a sprocket wheel or equivalent device 17 over which runs a flexible driving member 18 which is illustrated as consisting in part of a chain engaging the top of the sprocket wheel, so that the movement of the said driving member will rotate the said wheel. Inasmuch as the wheel is rigid with the target, the rotation of the wheel will swing the target to either side about its pivot, according to the direction in which the wheel is rotated. Cables or similar devices 19 are secured to the ends of the chain and pass through openings 20 in the bottom of the casing to and around idlers or guide pulleys 21 mounted upon the arm 9 and then extend inwardly to and over idlers or guide pulleys 22 on the dash-board, whence they are carried downward to a foot lever or pedal 23 to which they are attached, said foot lever or pedal being pivoted upon the dash-board between the ends of the cables, as shown at 24. To prevent the chain slipping from the sprocket wheel and thereby rendering the device inoperative, I employ a guard 25 which is in the form of an arcuate cap fitting over the chain and depending at one side slightly past the side of the chain and being provided at the opposite side with a lug 26 through which a suitable securing device is inserted into the target.

It will be readily understood from the foregoing description, taken in connection with the accompanying drawings, that if the pedal or foot lever 23 be vibrated, a pull will be exerted upon one of the cables 19 so as to draw the target to that side and persons observing the target will then know that it is intended to turn the vehicle in the direction in which the target points. Upon the pedal or foot lever being released, the spring attached to the target at once returns the same to its central vertical position and observers will then know that the vehicle is to travel straight ahead.

The apparatus, thus far described, will prove effective in day light, but, as vehicles are used at night or after dark to nearly as great an extent as in day light, I provide means for illuminating the signal, so that the vehicle may be continuously used. At the center of the head 14 of the target, I secure an incandescent electric lamp, indicated conventionally at 27, and the conductors 28 connected to the said lamp may be carried down the target arm or embedded therein in any convenient or preferred manner. The lower ends of these conductors are secured to contact points 29 carried by the target near the lower end thereof and at opposite sides of the same. I also provide within the casing three contact points, indicated conventionally at 30, one of said contact points being secured in the central vertical plane of the casing and the others being spaced at equal distances therefrom and at the opposite sides thereof. Electrical conductors or wires 31 lead from the battery or magneto to these contact points 30, one of these conductors being secured to the central contact point 30 and the other conductor being connected through branches with each of the side contact points 30. When the target is standing in a vertical position the contact points thereon will occupy positions intermediate the contact points on the casing and, consequently, the circuit through the lamp will be broken and the lamp will not burn. Should the target, however, be moved to either side, the contacts thereon will be brought against the central contact and the adjacent contact on the casing, so that the circuit through the lamp will be closed and the lamp will burn. As long as the lamp is not burning, the vehicle will indicate a straight ahead course, but when the lamp is burning the center of illumination will be at one or the other side of the apparatus and will, consequently, indicate an intention to turn the vehicle to that side.

My device is exceedingly simple in the construction, arrangement, and operation of its parts, so that it is not liable to get out of order and may be produced and put upon the market at a low cost.

What I claim is:

1. A signal of the character set forth comprising a casing, an arm pivotally mounted within the casing, a wheel rigid with the arm, an arcuate cap secured to the arm and extending over the said wheel, and a flexible driving member engaging the said wheel and disposed within the cap.

2. A signal of the character set forth comprising a casing, an arm pivotally mounted within and rising from the said casing, means connected with said arm within the casing for oscillating the same, a lamp carried by the upper end of the arm, spaced contact points on the arm near the lower end thereof, electrical conductors between the lamp and the said contact points, a fixed contact point in the casing, a pair of contact points fixed in the casing at opposite sides of the first mentioned contact point, an electrical conductor leading from the first mentioned contact point, and a branched electrical conductor leading from the said pair of contact points, all of said points being arranged to be engaged by the contact points on the arm.

In testimony whereof I affix my signature in presence of two witnesses.

OTTO W. SAMMT. [L. S.]

Witnesses:
F. L. WILLER,
B. H. SCHOELLERMAN.